(12) United States Patent
Wang et al.

(10) Patent No.: US 11,274,784 B2
(45) Date of Patent: Mar. 15, 2022

(54) IN-SERVICE REPAIR METHOD COMBINING EXTERNALLY BONDED PRE-STRESSED FRP AND POLYMER GROUTING FOR PCCP WITH BROKEN WIRE

(71) Applicants: WELEAD Infrastructure Engineering Technology (Zhengzhou), Ltd., Henan (CN); SAFEKEY Engineering Technology (Zhengzhou), Ltd., Henan (CN)

(72) Inventors: Fuming Wang, Henan (CN); Hongyuan Fang, Henan (CN); Kejie Zhai, Henan (CN); Peng Zhao, Henan (CN); Yanhui Pan, Henan (CN)

(73) Assignees: WELEAD Infrastructure Engineering Technology (Zhengzhou), Ltd., Henan (CN); SAFEKEY Engineering Technology (Zhengzhou), Ltd., Henan (CN)

( * ) Notice: Subject to any disclaimer, the term of this patent is extended or adjusted under 35 U.S.C. 154(b) by 0 days.

(21) Appl. No.: 16/892,168

(22) Filed: Jun. 3, 2020

(65) Prior Publication Data
US 2020/0292121 A1    Sep. 17, 2020

(30) Foreign Application Priority Data
Jul. 31, 2019    (CN) .......................... 201910703773.9

(51) Int. Cl.
*F16L 55/17*    (2006.01)
*F16L 55/18*    (2006.01)
(Continued)

(52) U.S. Cl.
CPC ............... *F16L 55/18* (2013.01); *F16L 55/00* (2013.01); *F16L 57/02* (2013.01); *F16L 55/17* (2013.01)

(58) Field of Classification Search
CPC . F16L 55/18; F16L 55/00; F16L 47/02; F16L 55/17
(Continued)

(56) References Cited

U.S. PATENT DOCUMENTS 5,632,307 A * 5/1997 Fawley ............... F16L 55/1686
138/97
6,336,983 B1 * 1/2002 Fawley ................... B29C 63/14
138/99

(Continued)

*Primary Examiner* — Patrick F Brinson

(57) ABSTRACT

A in-service repair method combing externally bonded pre-stressed FRP and polymer grouting for PCCP with broken wire, includes excavating PCCP, supporting the PCCP, treating outer wall of PCCP, bonded an external of the PCCP with pre-stressed FRP for repairing, laying grouting pipe, backfilling and grouting for densing. First of all, excavating a PCCP pipeline to be repaired and supporting the PCCP pipeline with a supporting device, smoothing the outer wall of the PCCP pipeline at a broken wire position and applying primer, and winding the FRP around a damaged portion of the PCCP pipeline, pre-stressing the FRP by applying a pre-stressing device and applying dipping glue to the FRP after tension to stick the FRP on the pipe wall, then laying a grouting pipe, backfilling the pipeline repaired, and finally injecting polymer into the soil after backfilling and compacting the soil by the grouting pipe pre-buried.

10 Claims, 4 Drawing Sheets

(51) Int. Cl.
*F16L 55/00* (2006.01)
*F16L 57/02* (2006.01)

(58) Field of Classification Search
USPC .......................... 138/99; 405/157, 179, 184.4
See application file for complete search history.

(56) References Cited

U.S. PATENT DOCUMENTS

| | | | | |
|---|---|---|---|---|
| 6,786,689 | B2* | 9/2004 | Dorris | B61D 45/003 410/47 |
| 7,033,114 | B2* | 4/2006 | Guedes De Melo | F16L 1/06 138/99 |
| 7,347,227 | B2* | 3/2008 | Zivanovic | B28B 21/62 138/172 |
| 9,027,605 | B2* | 5/2015 | Williams | F16L 55/175 138/99 |
| 9,909,708 | B1* | 3/2018 | Penland, Jr. | F16L 57/00 |
| 2004/0231740 | A1* | 11/2004 | Stubler | F16L 55/18 138/99 |
| 2009/0038702 | A1* | 2/2009 | Fyfe | F16L 55/162 138/98 |
| 2011/0280665 | A1* | 11/2011 | Emmons | F16L 55/1656 405/184.2 |
| 2014/0356529 | A1* | 12/2014 | Goodell | F16L 55/1655 427/236 |
| 2015/0204475 | A1* | 7/2015 | Brooks | F16L 55/1683 138/99 |

* cited by examiner

IN-SERVICE REPAIR METHOD COMBINING EXTERNALLY BONDED PRE-STRESSED FRP AND POLYMER GROUTING FOR PCCP WITH BROKEN WIRE

CROSS REFERENCE OF RELATED APPLICATION

The present application claims priority under 35 U.S.C. 119(a-d) to CN 201910703773.9, filed Jul. 31, 2019.

BACKGROUND OF THE PRESENT INVENTION

Field of Invention

The present invention relates to an in-service repair method for (pre-stressed steel tube concrete pipes) PCCP with broken wire, and more particular to a repair method combining externally bonded pre-stressed FRP and polymer grouting for PCCP with broken wire under a in-service condition.

Description of Related Arts

During the long-term operation of pre-stressed steel tube concrete pipes (PCCP), due to environmental corrosion, hydrogen embrittlement, pipe fabrication errors, pipeline installation and construction, material defects and so on, it will break. If the break is not found and repaired in time, it is likely to cause a tube burst accident during the operation of PCCP, causing huge economic losses and social impact.

The common methods for repair and reinforcement include excavation maintenance, and non-excavation maintenance. Excavation maintenance mainly includes post-tensioned pre-stressing method and outsourced concrete method. The post-tensioning pre-stressing method is to re-tension the pre-stress outside the broken wire tube, and then spray the protective layer on the outside of the steel wire. Although this method can be used to reinforce and strengthen the pipeline structure under in-service conditions, the construction process is complicated. For instance, the reinforcement of the pipes on both sides and the handling of the tension joint should be considered for a single pipe. The surrounding concrete process is to wrap a layer of new reinforced concrete outside the damaged pipe, but its structure and rigidity are not uniform along the axial direction of the pipe. It is only applicable to the pipes damaged by earthquake and small diameter pipes damaged caused by non-uniform settlement. Non-excavation maintenance methods mainly include two types: internal steel lining and FRP reinforcement. The method of lining steel plate is to insert a steel tube as a lining into the damaged tube, then restore the steel tube to a circular degree similar to the damaged tube and weld it, and then grout mortar gap between the lining and the damaged tube. This method of reinforced and strengthened pipes has good durability, however, it needs to interrupt water transmission during the repair process. It is suitable for reinforcing and strengthening longer pipe sections, and the reinforcement of single pipe is uneconomical. The FRP lining method is to stick fiber fabric inside the pipe, and the number of layers and direction of sticking depend on the damage of the pipe. Although this method of repair and reinforcement does not require excavation and does not affect the traffic operation around the pipe, the water needs to be cut off during the repair period, large-scale reinforcement takes a long time, and enough time is required after the FRP is pasted to ensure the bonding strength. On the whole, although the current excavation maintenance methods can be used to repair the broken wire of PCCP under in-service conditions, it is difficult to compact the soil backfill around the pipeline, which may lead to uneven settlement after PCCP repair, affecting the overall stress and stability of the pipeline. Although non-excavation maintenance methods have a small impact on the surrounding environment, the water needs to be cut off for during the repair period. In addition, PCCP is mostly used for long-distance water mains, which will seriously affect the daily life of urban residents. Therefore, there is an urgent need to develop a technical method capable of effectively repairing the broken wire of PCCP under in-service water conditions without causing secondary diseases after work.

SUMMARY OF THE PRESENT INVENTION

In view of the technical problems mentioned above, an object of the present invention is to provide a in-service repair method combing externally bonded pre-stressed FRP and polymer grouting for PCCP with broken wire. By wrapping pre-stressed FRP outside the broken PCCP, the strength of the pipeline structure is restored, and the soil around the pipeline is reinforced with polymer grouting to prevent the settlement after construction caused by the un-compacted backfill and cure the pipeline diseases.

A specific technical solution of the present invention is as follows.

A in-service repair method combing externally bonded pre-stressed FRP and polymer grouting for PCCP with broken wire, comprising excavating PCCP, supporting the PCCP, treating outer wall of PCCP, bonded an external of the PCCP with pre-stressed FRP for repairing, laying grouting pipe, backfilling and grouting for densing. First of all, excavating a PCCP pipeline to be repaired and supporting the PCCP pipeline with a supporting device, smoothing the outer wall of the PCCP pipeline at a broken wire position and applying primer, and winding the FRP around a damaged portion of the PCCP pipeline, pre-stressing the FRP by applying a pre-stressing device and applying dipping glue to the FRP after tension to stick the FRP on the pipe wall, then laying a grouting pipe, backfilling the pipeline repaired, and finally injecting polymer into the soil after backfilling and compacting the soil by the grouting pipe pre-buried.

The in-service repair method combing externally bonded pre-stressed FRP and polymer grouting for PCCP with broken wire, specifically comprises steps of:

(1) detecting a broken wire position and an amount of broken wires, performing 1:0.5 slope excavation for a pipe section at a broken wire part of a PCCP pipeline, and terminating excavation until a distance between the first excavation datum and a bottom of the PCCP pipeline is at a range of 15 cm-30 cm;

(2) taking the joints of the two sections of PCCP pipelines as pipe joints, continuing excavating, and excavating (1.5-2 m)×(0.8-1 m)×(0.5-0.8 m) supporting earth directly below the pipe joints, tamping the bottom of this supporting earthwork;

(3) centering the support device on the support earthwork directly below the pipe joint, and the two jacks on the support device are simultaneously raised until the support device and the pipe wall are closely fitted to form a support for the pipeline structure;

(4) repeating steps (2) and (3) until all the pipes at the broken wire position are fully supported;

(5) continuing to excavate the remaining parts of the broken wire pipeline except for supporting earthwork. The excavation depth is 30 cm-40 cm below the bottom of the PCCP pipe, and all parts of the broken wire pipeline to be repaired are exposed;

(6) polishing or break the position of the broken wire of the PCCP pipe to form a flat surface, then applying primer DZH-102 on the surface, and allowing the primer to air dry to form a smooth surface;

(7) wounding FRP on the PCCP pipeline through a pre-stress application device, and allying pre-stress to the FRP until the pre-stress reaches the design value;

(8) utilizing the dipping glue DZH-101 to fully soak the FRP wound on the PCCP pipe in step (7), and then performing curing and air drying;

(9) cutting off the FRP end fixed on the pre-stress applying device, and removing the pre-stress applying device;

(10) repeating steps (7) to (9) until the amount of FRP reaches the design requirements and all broken wire pipes are repaired;

(11) arranging a grouting pipe on both sides of the PCCP pipe; wherein one end of the grouting pipe is set at the bottom of the PCCP pipe, and the other end protrudes from the ground; holes are distributed on the grouting pipe from the bottom end of the PCCP pipe to the pipe side;

(12) backfilling and tamping the excavated part in step (5), removing the supporting device, and backfill and tamp the supporting earthwork;

(13) backfilling and tamp the excavated part in step (1);

(14) injecting the self-expanding double-slurry fast-setting polymer repairing material around the wall of the PCCP pipe through the grouting pipe exposed on the surface, wherein the repairing material flows out from the hole and diffuses around the pipe.

Preferably, the step (10) further comprises: after the broken wire pipeline is repaired in the step (10), applying epoxy asphalt to the FRP.

Preferably, in the step (11), the grouting pipe is fixed on the outer wall of the PCCP pipe by epoxy glue, and the grouting pipes are symmetrically arranged on both sides of the PCCP pipe, and the spacing between the grouting pipes is 1.5-2 m.

Preferably, the pre-stress applying device in the step (7) includes a tension rod I and a tension rod II; the tension rod I (and the tension rod II are connected by an arc-shaped rod. FRP, the two ends are respectively fixed to the tension rod I and the tension rod II, the tension rod II is connected with a fastening rod and a fastening rod through a force applying bolt, bolt holes are provided on the bolt, and the force bolt passes through the tension rod II and the tightening rod, and is fitted with a screw nut.

Preferably, the supporting device in the step (3) comprises an arc-shaped steel sheet bracket, and an end of the arc-shaped steel sheet bracket is provided with a support; the supporting device further includes a jack, a jack, cooperating support is under the support, a steel plate is connected to the bottom of the jack, and the steel plate is connected to the support device base plate by bolts.

Preferably, a clamping slot is provided on the support, and a jack is provided on the top of the jack.

Preferably, supports are provided at both ends of the arc-shaped steel sheet bracket, and a jack is supported under each support with force sensor.

Preferably, the arc-shaped steel sheet support is located below the PCCP pipe, and the arc of the arc-shaped steel sheet support matches the outer diameter of the PCCP pipe.

Preferably, the bottom plate of the support device is a high elastic mold steel material which is not easily deformed, a support earthwork is arranged below the bottom plate of the support device, and the bottom plate and the support earthwork of the support device are aligned, the joint of the two PCCP pipes is the pipe joint, and the supporting earthwork is directly below the pipe joint.

DETAILED DESCRIPTION OF THE PREFERRED EMBODIMENT

An in-service repair method combing externally bonded pre-stressed FRP and polymer grouting for PCCP with broken wire, comprises: excavating PCCP, supporting the PCCP, treating outer wall of PCCP, bonded an external of the PCCP with pre-stressed FRP for repairing, laying grouting pipe, backfilling and grouting for densing, excavating a PCCP pipeline to be repaired and supporting the PCCP pipeline with a supporting device, smoothing the outer wall of the PCCP pipeline at a broken wire position and applying primer, and winding the FRP around a damaged portion of the PCCP pipeline, pre-stressing the FRP by applying a pre-stressing device and applying dipping glue to the FRP after tension to stick the FRP on the pipe wall, then laying a grouting pipe, backfill the pipeline repaired, and finally injecting polymer into the soil after backfilling and compacting the soil by the grouting pipe pre-buried.

Figure 1:
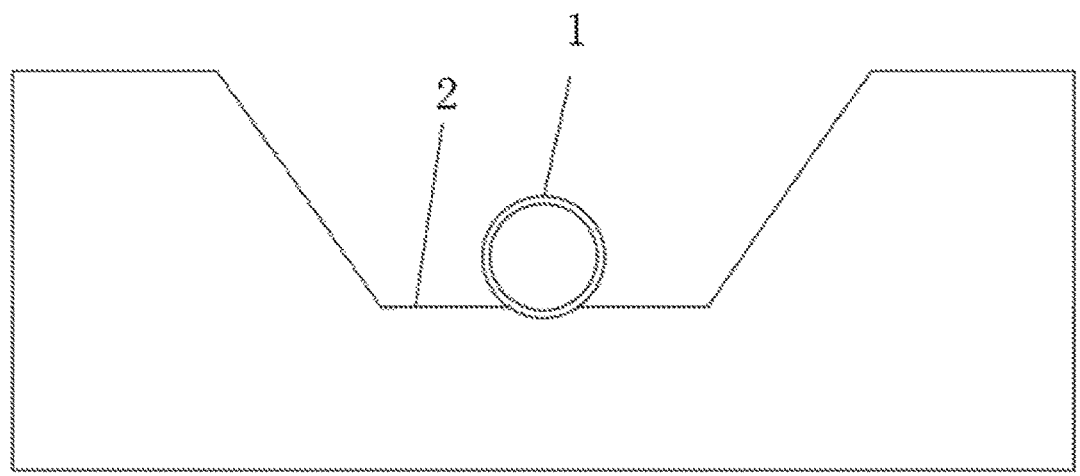
FIG. 1 is a schematic diagram of a position of a first excavation reference surface according to a preferred embodiment of the present invention.
Figure 6:
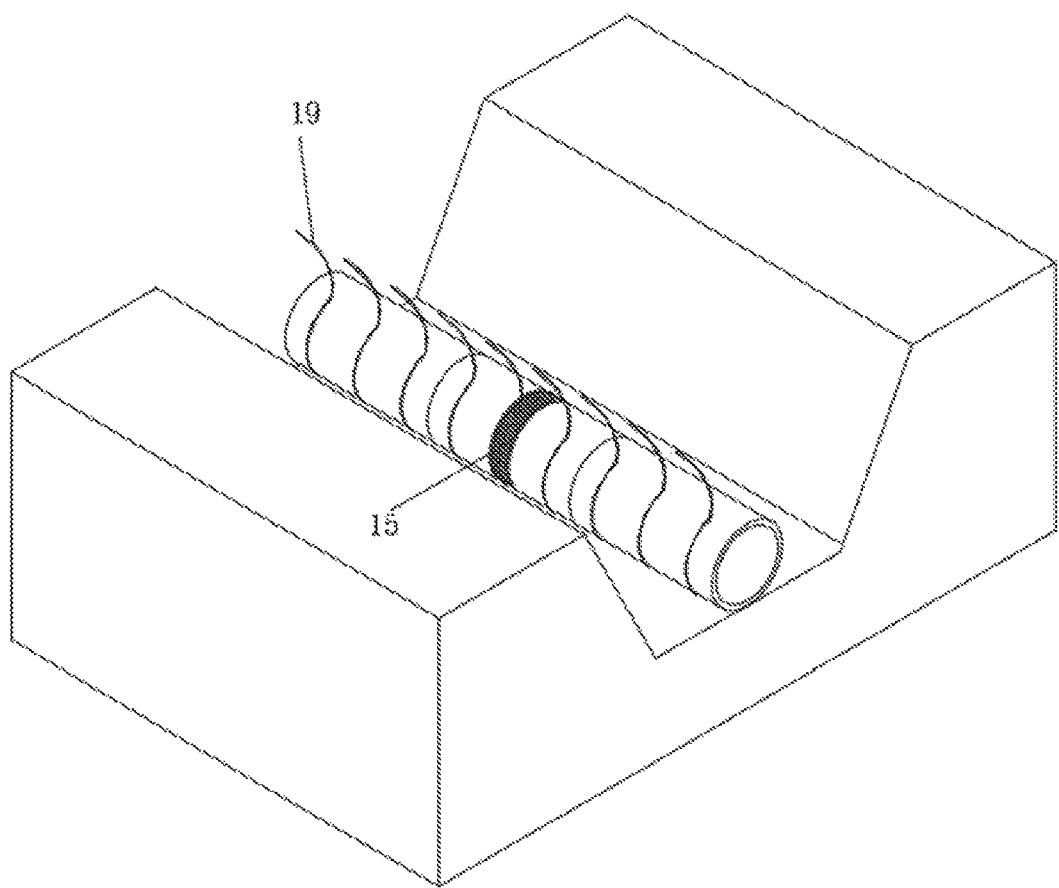
FIG. 6 is a schematic distribution diagram of a grouting pipe according to the present invention.
Figure 7:
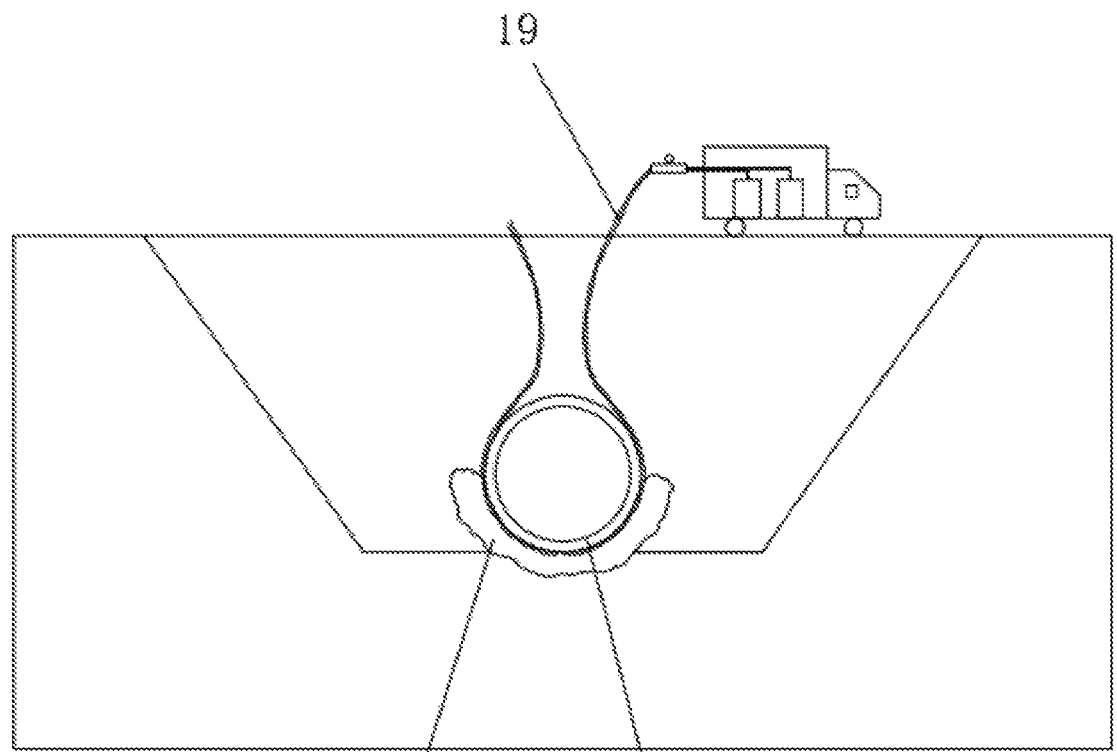
FIG. 7 is a schematic diagram of a side face of FIG. 6.
Figure 8:
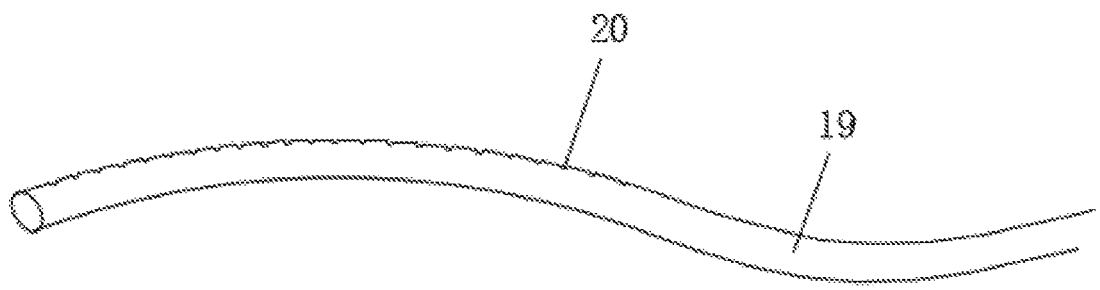
FIG. 8 is a schematic structural diagram of a grouting pipe according to the preferred embodiment of the present invention.

The in-service repair method combing externally bonded pre-stressed FRP and polymer grouting for PCCP with broken wire specifically comprises steps of:

(1) detecting the broken wire position and the number of broken wires, perform 1:0.5 grading excavation on the pipe section of the broken wire part of the PCCP pipeline, stop excavation to the first excavation datum level, stop excavation, and as shown in FIG. 1, for the first time face distance 15 cm-30 cm from the bottom of PCCP;

(2) the joints of the two sections of PCCP pipelines are pipe joints, continuing excavation, and excavate (1.5-2 m)×(0.8-1 m)×(0.5-0.8 m) supporting earth directly below the pipe joints, Tamp the bottom of this supporting earthwork;

(3) centering the support device on the support earthwork directly below the pipe joint, and the two jacks on the support device are simultaneously raised until the support device and the pipe wall are closely fitted to form a support for the pipeline structure;

(4) repeating steps (2) and (3) until all the pipes at the broken wire position are fully supported;

(5) continuing to excavate the remaining parts of the broken wire pipeline except for supporting earthwork, the excavation depth is 30 cm-40 cm below the bottom of the PCCP pipe, and all parts of the broken wire pipeline to be repaired are exposed;

(6) polishing or break the position of the broken wire of the PCCP pipe to form a flat surface, then applying primer DZH-102 on the surface, and allowing the primer to air dry to form a smooth surface;

(7) wounding FRP on the PCCP pipeline through a pre-stress application device, and allying pre-stress to the FRP until the pre-stress reaches the design value;

(8) utilizing the dipping glue DZH-101 to fully soak the FRP wound on the PCCP pipe in step (7), and then performing curing and air drying;

(9) cutting off the FRP end fixed on the pre-stress applying device, and removing the pre-stress applying device;

(10) repeating steps (7) to (9) until the amount of FRP reaches the design requirements and all broken wire pipes are repaired;

(11) arranging a grouting pipe on both sides of the PCCP pipe 19; as shown in FIGS. 6-8, wherein one end of the grouting pipe is set at the bottom of the PCCP pipe, and the other end protrudes from the ground; holes are distributed on the grouting pipe from the bottom end of the PCCP pipe to the pipe side;

(12) backfilling and tamping the excavated part in step (5), removing the supporting device, and backfill and tamp the supporting earthwork;

(13) backfilling and tamp the excavated part in step (1);

(14) injecting the self-expanding double-slurry fast-setting polymer repairing material around the wall of the PCCP pipe through the grouting pipe exposed on the surface, wherein the repairing material flows out from the hole and diffuses around the pipe.

Figure 4:
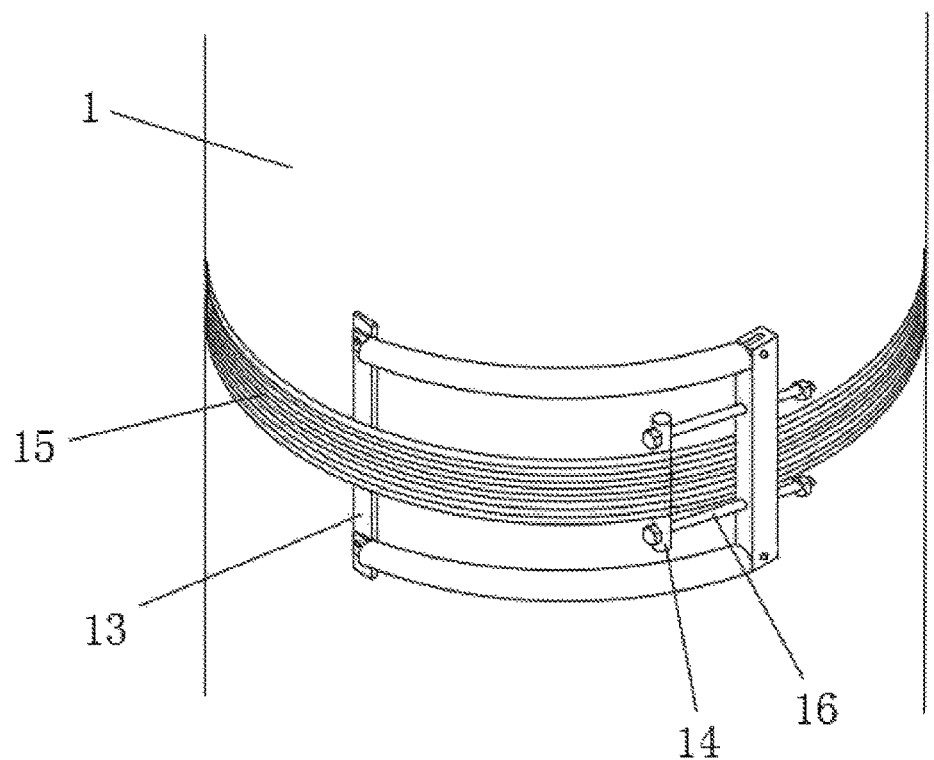
FIG. 4 is a schematic diagram of a utilization state of a pre-stress applying device of the present invention.
Figure 5:
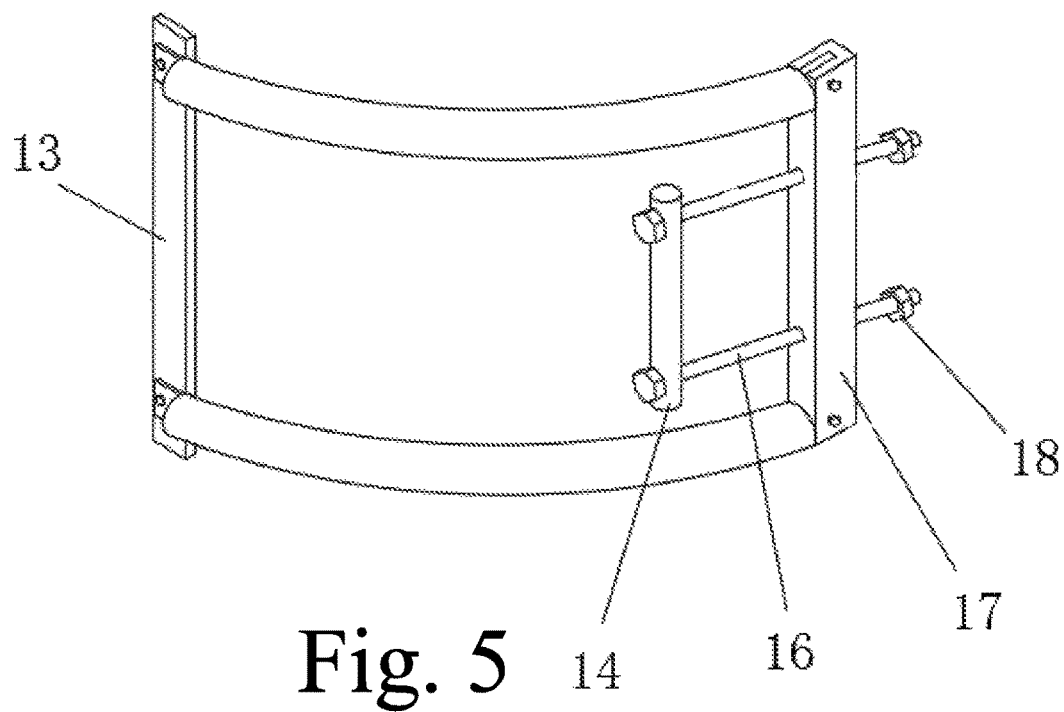
FIG. 5 is a schematic structural diagram of the pre-stress applying device according to the preferred embodiment of the present invention.

As shown in FIGS. 4-5, the FRP pre-stressing device is a special curved rod tensioning device. The pre-stressing device includes a tension rod I13 and a tension rod II14. The tension rod I13 and the tension rod II14 are connected by an arc rod. The two ends of FRP15 are respectively fixed on the tension rod I 13 and the tension rod II 14. The tension rod II14 is connected with a fastening rod 17 through a force applying bolt 16. The fastening rod 17 is provided with a bolt hole, and the force applying bolt 16 passes through the tension rod II 14. A tightening nut 18 is fitted behind the fastening rod 17.

The process of winding the FRP by the pre-stressing device in step (7) is to fix the two ends of the FRP to the tension rod I 13 and the tension rod II 14, respectively, and wind the FRP on the PCCP pipe, and pass the tension bolt 16 through the tension rod II14 The fastening rod 17 connects the two, the end of the force bolt 16 is fitted with a screw nut 18, and the arc rod is used to connect the tension rod I13 and the tension rod II14 to complete the assembly of the pre-stress application device, and then alternately rotate Tighten the nut 18 on the force bolt, tension the FRP, and apply pre-stress.

In the step (9), after the FRP is pasted on the wall of the PCCP pipe, the FRP end on the tension rod II14 is cut off, and the portion of the tension rod I wider than the FRP is cut, so that the tension rod I and the FRP wound on the PCCP pipeline The width is the same, after which the entire pre-stressing device is removed.

Figure 2:
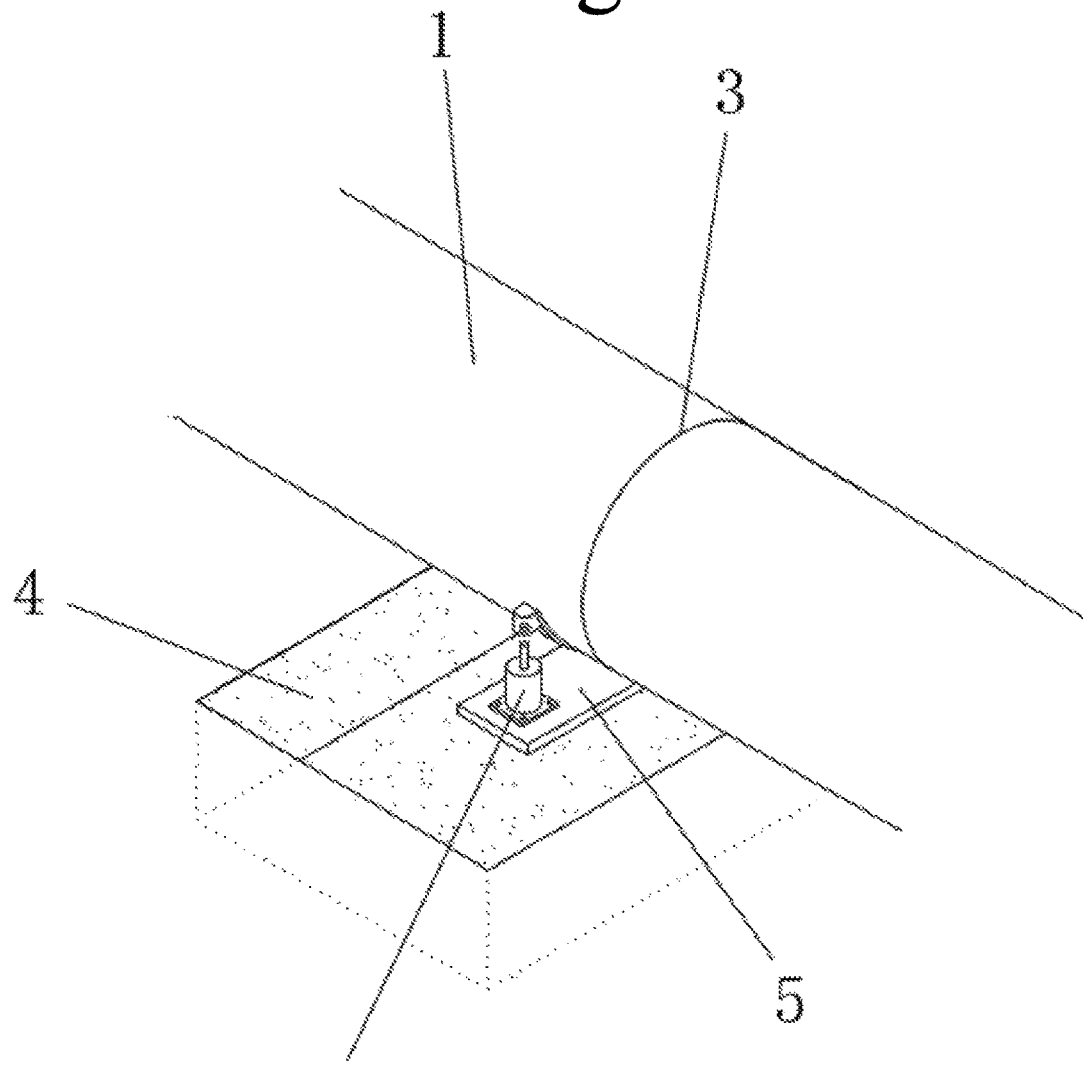
FIG. 2 is a schematic diagram of a utilization state of a supporting device according to the preferred embodiment of the present invention.
Figure 3:
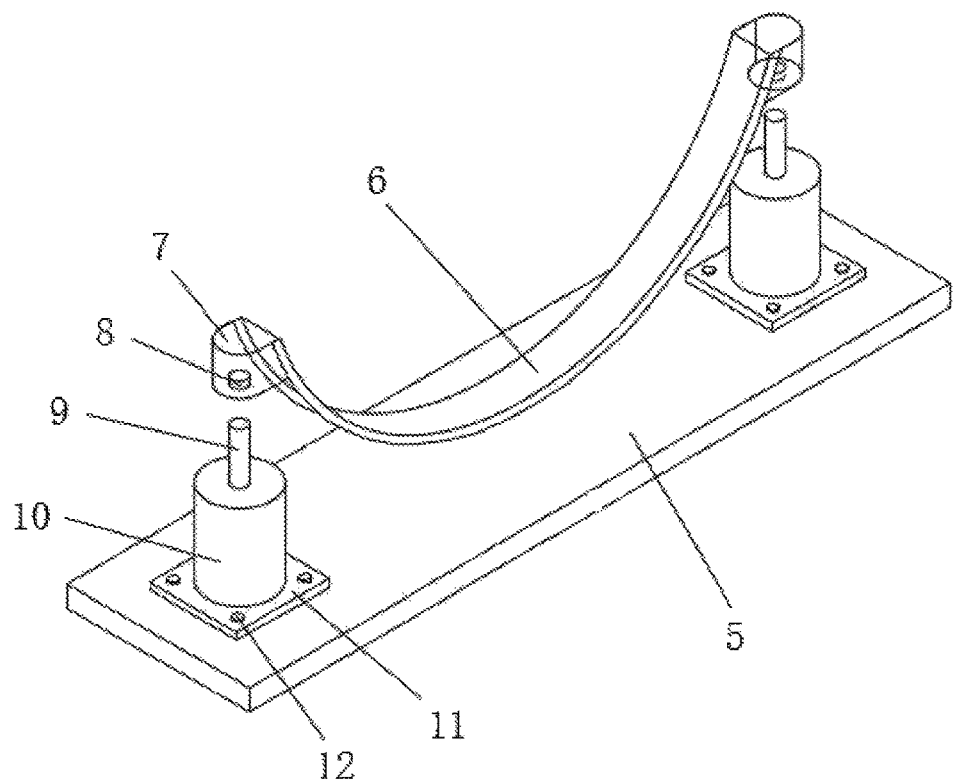
FIG. 3 is a schematic structural diagram of the supporting device according to the preferred embodiment of the present invention.

As shown in FIGS. 2-3, the support device for the excavation and repair of the PCCP with broken wire includes an arc-shaped steel sheet support 6, and the arc of the arc-shaped steel sheet support 6 fits the outer diameter of the PCCP pipe 1, so that the PCCP pipe 1 It can be subjected to stable and uniform lifting force, and the arc-shaped steel sheet support 6 is located below the PCCP pipe 1. The supporting device further comprises a jack. A support 7 is provided at the end of the arc-shaped steel sheet support 6. The jack 10 is cooperatively supported below the support 7. Specifically, the support 7 is provided with a slot 8 and the jack 10 is provided with a tip 9, the end 9 is fitted in the slot 8, and the jack 10 is supported under the support through the cooperation of the slot and the end. A steel plate 11 is connected to the bottom of the jack 10, and the steel plate 11 is connected to the supporting device bottom plate 5 by bolts 12.

Supports 7 are provided at both ends of the arc-shaped steel sheet support 6, and a jack 10 is supported under each support 7, two jacks 10 are synchronous jacks, two jacks 10 can be synchronously lifted, and force sensors are set in the jacks 10. During the jacking process of the jack 10, the jacking force on the PCCP pipe 1 is controlled.

The bottom plate 5 of the supporting device is a high elastic mold steel material which is not easily deformed. The supporting earth 4 is arranged below the bottom plate 5 of the supporting device, and the bottom 5 of the supporting device and the supporting earth 4 are aligned. 3. The supporting earthwork 4 is located directly below the pipe section 3.

The process of the support device supporting the pipeline in step (3) is:

(1) placing the supporting device bottom plate 5 on the supporting earthwork and center it so that the supporting device bottom plate is placed at the center of the upper plane of the supporting earthwork;

(2) utilizing the bolt 12 to connect the jack 10 to the bottom plate of the supporting device;

(3) placing the support 7 on both sides of the curved steel sheet support 6 above the end 9 of the jack, and the end fits into the card slot of the support;

(4) jacking the two jacks 10 are simultaneously until the arc-shaped steel sheet bracket 6 is closely attached to the outer wall of the pipe 1 to form a support for the pipe structure.

What described above are only preferred embodiments of the present invention. It should be noted that for those skilled in the art, without departing from the overall concept of the present invention, several changes and improvements can be made. These should also be considered as the protection scope of the present invention.

What is claimed is:

1. An in-service repair method combining externally bonded pre-stressed FRP (fiber reinforced polymer) and polymer grouting for PCCP (pre-stressed steel tube concrete pipes) with broken wire, comprising excavating the PCCP, supporting the PCCP, treating an outer wall of the PCCP, bonding an external surface of the PCCP with pre-stressed FRP for repairing, laying grouting pipe, backfilling and grouting for densing, excavating the PCCP pipeline to be repaired and supporting the PCCP pipeline with a supporting device, smoothing the outer wall of the PCCP pipeline at a broken wire position and applying primer, and winding the FRP around a damaged portion of the PCCP pipeline, pre-stressing the FRP by applying a pre-stressing device and applying dipping glue to the FRP after tension to stick the FRP on the pipe wall, then laying a grouting pipe, backfill the pipeline repaired, and finally injecting polymer into the soil after backfilling and compacting the soil by the grouting pipe pre-buried.

2. The in-service repair method combining externally bonded pre-stressed FRP and polymer grouting for PCCP with broken wire, as recite in claim 1, specifically comprising steps of:
(1) detecting a broken wire position and an amount of broken wires, performing 1:0.5 slope excavation for a pipe section at a broken wire part of a PCCP pipeline, and terminating excavation until a distance between a first excavation datum and a bottom of the PCCP pipeline is at a range of 15 cm-30 cm;
(2) taking joints of the two sections of PCCP pipelines as pipe joints, continuing excavating, and excavating (1.5-2 m)×(0.8-1 m)×(0.5-0.8 m) supporting earth directly below the pipe joints, tamping the bottom of this supporting earthwork;
(3) centering the supporting device on the support earthwork directly below the pipe joint, and the two jacks on the supporting device are simultaneously raised until the supporting device and the pipe wall are closely fitted to form a support for the pipeline structure;
(4) repeating steps (2) and (3) until all the pipes at the broken wire position are fully supported;
(5) continuing to excavate the remaining parts of the broken wire pipeline except for supporting earthwork, the excavation depth is 30 cm-40 cm below the bottom of the PCCP pipe, and all parts of the broken wire pipeline to be repaired are exposed;
(6) polishing or break the position of the broken wire of the PCCP pipe to form a flat surface, then applying primer DZH-102 on the surface, and allowing the primer to air dry to form a smooth surface;
(7) winding FRP on the PCCP pipeline through a pre-stress application device, and allying pre-stress to the FRP until the pre-stress reaches the design value;
(8) utilizing the dipping glue DZH-101 to fully soak the FRP wound on the PCCP pipe in step (7), and then performing curing and air drying;
(9) cutting off the FRP end fixed on the pre-stress applying device, and removing the pre-stress applying device;
(10) repeating steps (7) to (9) until the amount of FRP reaches the design requirements and all broken wire pipes are repaired;
(11) arranging a grouting pipe on both sides of the PCCP pipe; wherein one end of the grouting pipe is set at the bottom of the PCCP pipe, and the other end protrudes from the ground; holes are distributed on the grouting pipe from the bottom end of the PCCP pipe to the pipe side;
(12) backfilling and tamping the excavated part in step (5), removing the supporting device, and backfilling and tamping the supporting earthwork;
(13) backfilling and tamp the excavated part in step (1);
(14) injecting the self-expanding double-slurry fast-setting polymer repairing material around the wall of the PCCP pipe through the grouting pipe exposed on the surface, wherein the repairing material flows out from the hole and diffuses around the pipe.

3. The in-service repair method combining externally bonded pre-stressed FRP and polymer grouting for PCCP with broken wire, as recite in claim 1, further comprising: after the broken wire pipeline is repaired in the step (10), applying epoxy asphalt to the FRP.

4. The in-service repair method combining externally bonded pre-stressed FRP and polymer grouting for PCCP with broken wire, as recite in claim 1, wherein in the step (11), the grouting pipe is fixed on the outer wall of the PCCP pipe by epoxy glue, and the grouting pipes are symmetrically arranged on both sides of the PCCP pipe, and the spacing between the grouting pipes is 1.5-2 m.

5. The in-service repair method combining externally bonded pre-stressed FRP and polymer grouting for PCCP with broken wire, as recite in claim 1, wherein the pre-stress applying device in the step (7) includes a tension rod I (13) and a tension rod II (14); the tension rod I (13) and the tension rod II (14) are connected by an arc-shaped rod, two ends of FRP (15) are respectively fixed to the tension rod I (13) and the tension rod II (14), the tension rod II (14) is connected with a fastening rod (17) and a fastening rod (17) through a force applying bolt (16); bolt holes are provided on the bolt, and the force bolt (16) passes through the tension rod II (14) and the tightening rod (17), and is fitted with a screw nut (18).

6. The in-service repair method combining externally bonded pre-stressed FRP and polymer grouting for PCCP with broken wire, as recite in claim 1, wherein the supporting device in the step (3) comprises an arc-shaped steel sheet bracket (6), and an end of the arc-shaped steel sheet bracket (6) is provided with a support (7); the supporting device further includes a jack (10) which is cooperatedly supported under the support (7), a steel plate (11) is connected to the bottom of the jack (10), and the steel plate (11) is connected to the supporting device base plate (5) by bolts (12).

7. The in-service repair method combining externally bonded pre-stressed FRP and polymer grouting for PCCP with broken wire, as recite in claim 6, wherein a clamping slot (8) is provided on the support (7).

8. The in-service repair method combining externally bonded pre-stressed FRP and polymer grouting for PCCP with broken wire, as recite in claim 7, wherein supports (7) are provided at both ends of the arc-shaped steel sheet bracket (6), and a jack (10) is supported under each support (7) with force sensor.

9. The in-service repair method combining externally bonded pre-stressed FRP and polymer grouting for PCCP with broken wire, as recite in claim 6, wherein the arc-shaped steel sheet support (6) is located below the PCCP pipe (1), and the arc of the arc-shaped steel sheet support (6) matches the outer diameter of the PCCP pipe (1).

10. The in-service repair method combining externally bonded pre-stressed FRP and polymer grouting for PCCP with broken wire, as recite in claim 6, wherein the base plate (5) of the supporting device is a high elastic mold steel material which is not easily deformed, a support earthwork (4) is arranged below the base plate (5) of the supporting device, and the base plate (5) and the support earthwork (4) of the supporting device are aligned, the joint of the two PCCP pipes (1) is the pipe joint (3), and the supporting earthwork (4) is directly below the pipe joint (3).

* * * * *